United States Patent Office.

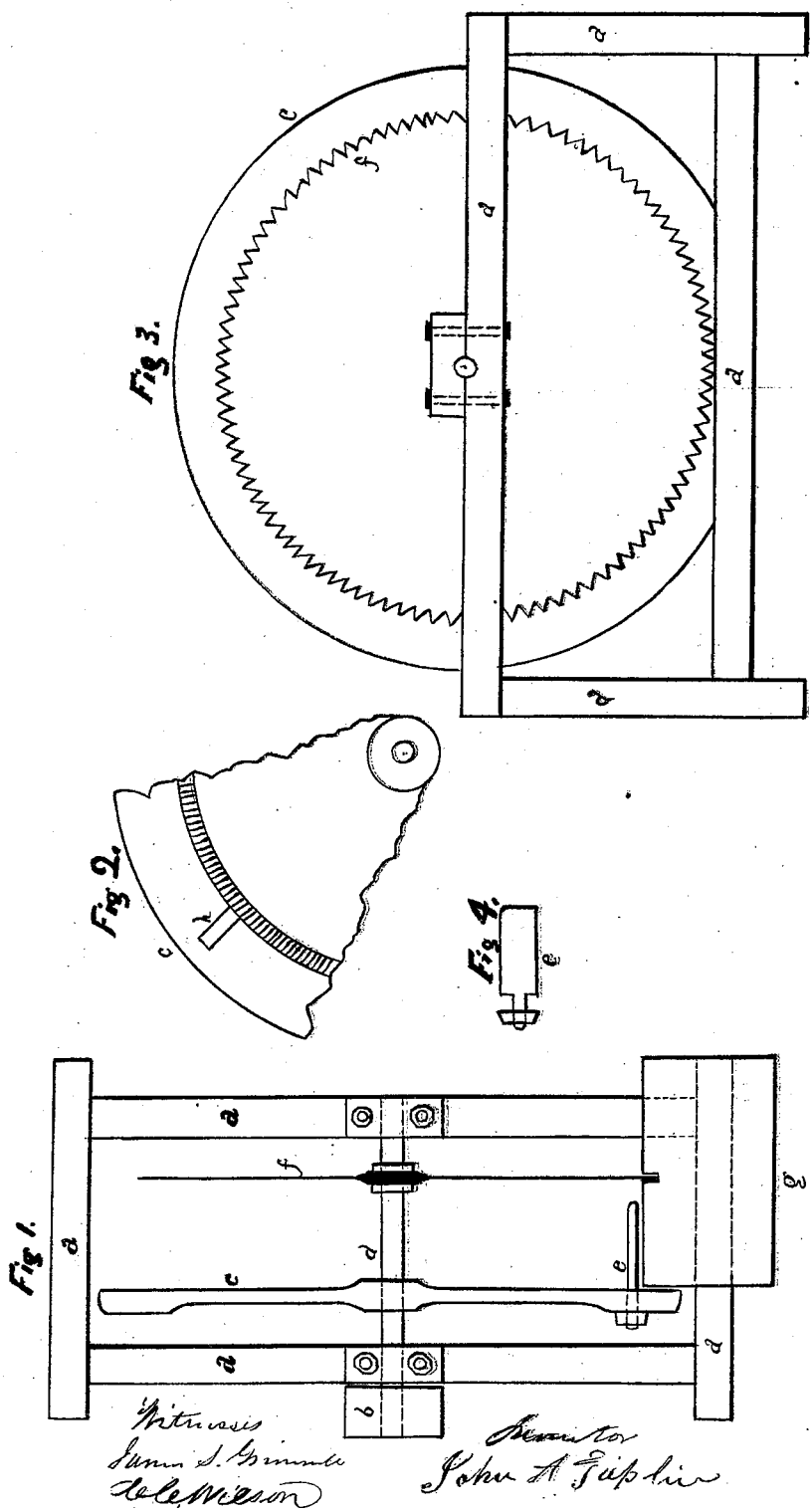

JOHN A. TAPLIN, OF CARTHAGE LANDING, FISHKILL, NEW YORK.

Letters Patent No. 98,206, dated December 21, 1869.

IMPROVEMENT IN MACHINE FOR SAWING AND SPLITTING WOOD.

The Schedule referred to in these Letters Patent and making part of the same

*To all whom it may concern:*

Be it known that I, JOHN A. TAPLIN, of Carthage Landing, in the town of Fishkill, county of Dutchess, and State of New York, have invented a new and useful Machine for Sawing and Splitting, by the Same Operation, Wood for Kindling-Purposes; and I do hereby declare that the following is a full, clear, and exact description of the method of construction and operation of the same, reference being had to the accompanying drawings, making a part of this specification, in which—

Figure 1 is a bird's-eye view;

Figure 2 is a sectional view of the iron disk and slot;

Figure 3, a side view; and

Figure 4 is a view of the splitting-knife and nut.

$a$ is the frame, on which the machine rests.

$b$ is a driving-pulley, attached to the end of the arbor $d$.

$c$ is a cast-iron disk, in which is the slot $h$, as seen in fig. 2, for fastening the splitting-knife $e$, which is held in position by means of the nut and screw, as seen in figs. 1 and 4.

$f$ is a circular saw, fastened to the arbor $d$.

The cast-iron disk is circular, and smooth on the inside next to the saw, and of sufficient weight to answer the purpose of a balance-wheel. It is movable on the arbor $d$, and held in position, at any desired point, by any of the known devices used for such purpose.

The slot $h$, fig. 2, in the disk $c$, is so constructed that the splitting-knife $e$ can be moved toward and from the centre of the disk, and, when in position, the end farthest from the disk will be about one-half of an inch from the saw, and will revolve in or near the same circle with the teeth of the saw, so that in each revolution of the machine, the knife $e$ will split the wood to, or nearly to the depth cut by each revolution of the saw.

The length of the knife $e$ and the distance of the iron disk from the saw are determined by the length into which the wood is to be cut for kindling-purposes.

The machine is operated by power applied in any of the ordinary ways, to the driving-pulley $b$.

What I claim as my invention, and desire to secure by Letters Patent, is—

In a rotary sawing and splitting-machine, the combination of an iron disk and splitting-knife with a circular saw, each constructed, and the whole arranged substantially as and for the purposes herein described.

JOHN A. TAPLIN.

Witnesses:
ELLIOT T. FARR,
DARIUS MEAD.